US010602562B2

(12) United States Patent
Antsev et al.

(10) Patent No.: US 10,602,562 B2
(45) Date of Patent: Mar. 24, 2020

(54) ESTABLISHING COMMUNICATION SESSIONS BY DOWNGRADING

(71) Applicant: T-Mobile USA, Inc., Bellevue, WA (US)

(72) Inventors: Boris Antsev, Bothell, WA (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 79 days.

(21) Appl. No.: 15/830,968

(22) Filed: Dec. 4, 2017

(65) Prior Publication Data

US 2019/0014613 A1    Jan. 10, 2019

Related U.S. Application Data

(60) Provisional application No. 62/529,143, filed on Jul. 6, 2017.

(51) Int. Cl.
*H04W 76/18* (2018.01)
*H04L 29/06* (2006.01)
(Continued)

(52) U.S. Cl.
CPC ......... *H04W 76/18* (2018.02); *H04L 65/1006* (2013.01); *H04L 65/1069* (2013.01);
(Continued)

(58) Field of Classification Search
CPC .. H04W 76/18; H04W 76/50; H04L 65/1006; H04L 65/1069; H04L 65/1073; H04L 65/80; H04M 1/72519; H04M 1/2552
See application file for complete search history.

(56) References Cited

U.S. PATENT DOCUMENTS 9,462,125 B1   10/2016 Schumacher
2005/0101287 A1*  5/2005 Jin ..................... H04M 1/677
                                                   455/404.1
(Continued)

FOREIGN PATENT DOCUMENTS

WO    WO2016023571 A1    2/2016

OTHER PUBLICATIONS

PCT Search Report and Written Opinion dated Oct. 8, 2018 for PCT Application No. PCT/US18/39790, 12 pages.

*Primary Examiner* — Jenee Holland
(74) *Attorney, Agent, or Firm* — Lee & Hayes, P.C.

(57) ABSTRACT

An originating user equipment (UE) that initiates a communication session as a real time text (RTT)-based communication may be configured to automatically downgrade the communication session in response to identifying one or more attributes of a response to a session request that indicate a communication session cannot be established with a full set of features requested by the user. For example, the originating UE can determine that a response to a session request indicates at least one of (i) an inability to establish the communication session, or (ii) an ability to establish the communication session without support for the exchange of the non-voice content via the RTT media stream. Based on this determination, a communication session can be established that does not support the exchange of the non-voice content via the RTT media stream. In this manner, rich RTT features are sacrificed in order to connect the user.

18 Claims, 11 Drawing Sheets

(51) Int. Cl.
*H04M 1/725* (2006.01)
*H04W 76/50* (2018.01)

(52) U.S. Cl.
CPC .......... *H04L 65/1073* (2013.01); *H04L 65/80* (2013.01); *H04M 1/72519* (2013.01); *H04M 1/72577* (2013.01); *H04M 1/72552* (2013.01); *H04W 76/50* (2018.02)

(56) References Cited

U.S. PATENT DOCUMENTS

| | | | |
|---|---|---|---|
| 2006/0230161 A1 | 10/2006 | Bae et al. | |
| 2008/0101552 A1* | 5/2008 | Khan | H04L 12/66 379/45 |
| 2008/0200143 A1* | 8/2008 | Qiu | H04M 1/2535 455/404.2 |
| 2009/0201940 A1 | 8/2009 | Jin | |
| 2010/0002846 A1* | 1/2010 | Ray | G10L 13/043 379/37 |
| 2010/0150333 A1* | 6/2010 | Goodman | H04M 7/0042 379/207.02 |
| 2010/0297980 A1* | 11/2010 | Alberth | H04M 1/72536 455/404.2 |
| 2010/0297981 A1* | 11/2010 | Ballantyne | H04M 1/72536 455/404.2 |
| 2011/0141979 A1* | 6/2011 | Keller | H04W 36/0022 370/328 |
| 2012/0034897 A1* | 2/2012 | Kreitzer | H04M 3/5116 455/404.1 |
| 2012/0218920 A1* | 8/2012 | Varga | H04W 4/90 370/259 |
| 2013/0303107 A1* | 11/2013 | Mitchell, Jr. | H04W 4/90 455/404.2 |
| 2014/0106699 A1* | 4/2014 | Chitre | H04W 76/25 455/404.1 |
| 2015/0031324 A1* | 1/2015 | Zentner | H04W 4/90 455/404.2 |
| 2015/0201158 A1 | 7/2015 | Yin | |
| 2016/0337831 A1* | 11/2016 | Piett | H04W 4/90 |
| 2016/0353266 A1* | 12/2016 | Winkler | H04W 4/90 |
| 2017/0238159 A1* | 8/2017 | Rao | H04W 4/90 455/404.2 |
| 2017/0245123 A1* | 8/2017 | Baek | H04W 4/90 |
| 2018/0096676 A1* | 4/2018 | Chiang | H04M 3/42382 |

* cited by examiner

ESTABLISHING COMMUNICATION SESSIONS BY DOWNGRADING

CROSS REFERENCE TO RELATED APPLICATIONS

This application claims priority to commonly assigned, U.S. Provisional Patent Application Ser. No. 62/529,143, filed Jul. 6, 2017. Application Ser. No. 62/529,143 is fully incorporated herein by reference.

BACKGROUND

Real time text (RTT) allows for a near instantaneous transmission of text content between Internet Protocol (IP)-based terminals. As a user of a source device types a RTT message, the text content of the RTT message is displayed on a destination device in real-time, without requiring the user of the source device to select a "send" button. This near instantaneous transmission of text content resembles a more natural conversation that is preferred by the hearing and speech impaired over traditional text messaging (e.g., Short Message Service (SMS) text). RTT also allows both parties of a communication session to type concurrently (e.g., allowing one user to interrupt the other user), and RTT can be implemented as an add-on to voice, which enables simultaneous voice and RTT media streams. A voice call that allows for the transmission of text content via an RTT media stream (in parallel with voice) is sometimes referred to as a "RTT call".

The Federal Communications Commission (FCC) has mandated that certain wireless carriers support RTT technology earlier than others, which means that some carrier networks may not support RTT technology for some time, even though many mobile handsets will be capable of making RTT calls on carrier networks that support the technology. Furthermore, it is possible that a RTT-capable handset will fail to establish a RTT call, even when a RTT-capable carrier network is available to the handset. This may be due to RTT-related network outages impacting the entire RTT call (not just the text component of the call). When a user cannot establish a RTT call, the user may be forced to redial in an attempt connect the call. This needlessly consumes network bandwidth, and it can be inconvenient for a user making a non-emergency call. In emergency situations, a failure to connect the user can delay emergency responders, which may cause harm to people in emergency situations. Furthermore, if a handset is preconfigured to establish a call as a RTT call by default, a user may have to open a settings menu to change the behavior of the handset so that calls will be made as voice-only (i.e., non-RTT) calls. This time consuming process to change call settings on the handset can also be dangerous in emergency situations because a delay in responding to an emergency situation can have serious consequences.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
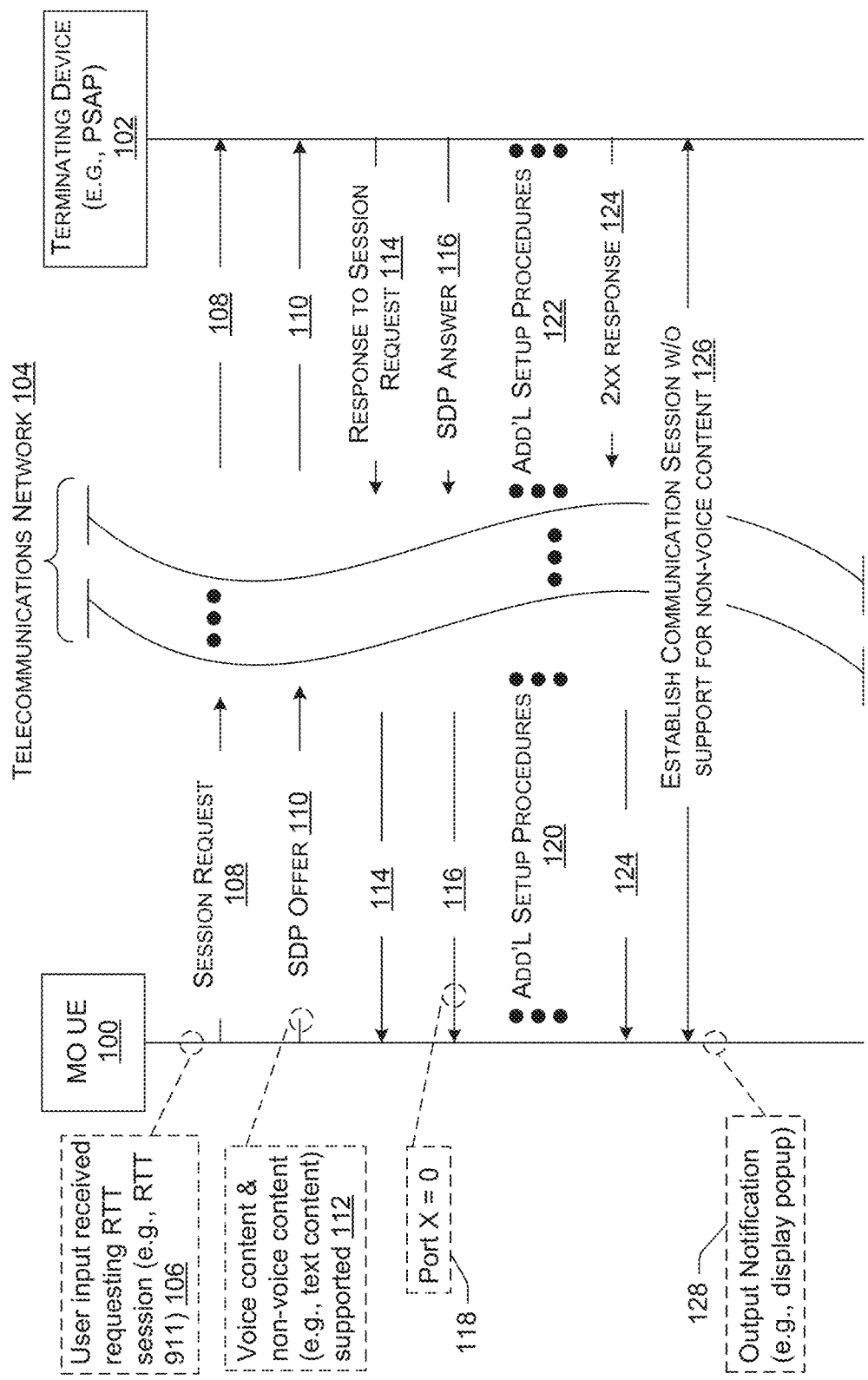
FIG. 1 is a diagram illustrating example signaling between an originating user equipment (UE) and a terminating device to establish a communication session by downgrading.

Described herein are, among other things, techniques for an originating user equipment (UE) to establish a communication session by downgrading. "Downgrading," in this context, means eliminating support for one or more originally-requested features of the communication session. Downgrading, in this context, may allow the originating UE to connect the user when a communication session cannot otherwise be established with a full set of features requested by the user.

In an example, a user may decide that he/she would like to contact another person or service over a telecommunications network. In order to contact the person or service, the user may provide user input to an originating UE to establish a communication session. In several examples described herein, the user provides user input by dialing an emergency short code (e.g., 911 in the United States) to contact a public safety answering point (PSAP) during an emergency situation. Furthermore, with the advent of real time text (RTT) calling, the user can request establishment of a communication session that supports an exchange of non-voice content (e.g., text content) via a RTT media stream in addition to an exchange of voice content via a voice media stream. For instance, the originating UE may provide an option for the user to initiate a RTT call (as opposed to a voice-only call) so that the user can send non-voice content (e.g., text content) via a RTT media stream during the call.

In response to receiving user input requesting a RTT-based communication session, the originating UE sends a session request over a telecommunications network. In some instances, the originating UE may determine, based on a response to the session request, that the requested communication session cannot be established at all. In other instances, the originating UE may determine, based on the response to the session request, that the requested communication session can be established, but the communication session will not be able to support the exchange of the non-voice content via an RTT media stream. To make this determination, the originating UE may identify one or more particular attributes of the response to the session request that indicate a communication session cannot be established with a full set of features requested by the user.

If and when the originating UE determines that the response to the session request indicates either an inability to establish the communication session, or an ability to establish the communication session without support for the exchange of the non-voice content via the RTT media stream, the originating UE may automatically downgrade the communication session in order to connect the user. For example, the originating UE may, without user intervention, establish a new communication session or a downgraded version of the communication session that eliminates support for the exchange of the non-voice content via the RTT media stream, while maintaining the support for the exchange of voice content via the voice media stream. In other words, the requested communication session may be downgraded to, or re-established as, a communication session that supports some, but not all, of the originally requested features, such as by supporting voice, but eliminating support for the exchange of non-voice content via an RTT media stream.

The originating UE may further output a notification that indicates a lack of support for at least some of the originally requested features. For example, the originating UE may output a notification (e.g., visually, audibly, or the like) to notify a user that his/her communication session does not support the exchange of non-voice content via an RTT media stream, as originally requested. In this manner, the user is informed of the inability to communicate using non-voice content (e.g., text content) during the communication session, which the user may have expected to be available had he/she not been informed.

By downgrading in order to establish a communication session, one or more devices can be configured to conserve resources with respect to communications bandwidth resources, processing resources, memory resources, power resources, and/or other resources. For instance, automatically downgrading to establish a communication session may reduce and/or eliminate repeated attempts by the calling party to contact the called party, thereby conserving communications bandwidth resources and other resources (both on the terminals and in the telecommunications network) that may be required to handle repeated attempts at establishing a communication session. In addition, reliability of a telecommunications system is improved by prioritizing connectivity over the provisioning of rich features during a communication session. When a user is making a non-emergency call, a user may enjoy the added convenience of being connected to a called party (person or service)—albeit without a full set of originally-requested features—instead of manually changing settings on the originating UE in order to achieve a similar result. In emergency situations—where connecting the user's call is of the utmost importance—reliably connecting the user's call by downgrading can allow emergency responders to address an emergency situation quickly and effectively. Additional technical effects can also be realized from an implementation of the technologies disclosed herein.

Also described herein are systems and devices comprising one or more processors and one or more memories, as well as non-transitory computer-readable media storing computer-executable instructions that, when executed, by one or more processors perform various acts and/or processes disclosed herein.

FIG. 1 is a diagram illustrating example signaling between an originating user equipment (UE) 100 (designated as "MO UE" 100 in FIG. 1, "MO" meaning "mobile originated" or "mobile originating") and a terminating device 102, the signaling representing a technique to establish a communication session by downgrading. The terminating device 102 can be any suitable type of terminating device 102 depending on the user input provided by the user at the originating UE 100. For example, if a user dials an emergency short code (e.g., 911 in the United States), the terminating device 102 may be a PSAP. If the user dials (or selects from a list of contacts) a non-emergency number associated with another user, the terminating device 102 may be a terminating UE (sometimes called a "MT UE," "MT" meaning "mobile terminated" or "mobile terminating").

In accordance with various embodiments described herein, the terms "user equipment (UE)," "communication device," "device," "wireless communication device," "wireless device," "mobile device," "terminal," "wireless terminal," "mobile terminal," and "client device," may be used interchangeably herein to describe any UE (e.g., the originating UE 100, the terminating device 102, etc.) that capable of transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Furthermore, the originating UE 100 and the terminating device 102 may individually be implemented as any suitable type of communication device configured to communicate over a telecommunications network 104, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar communication device.

In addition, the originating UE 100 and the terminating device 102 may be mobile devices, or they may be non-mobile (or situated) communication devices including, without limitation, a television (smart television), a set-top-box (STB), a game console, a desktop computer, and the like.

In general, a user can utilize the originating UE 100 to communicate with other users and associated terminals via the telecommunications network 104. A user of the originating UE 100 is sometimes referred to herein as the "calling party," while a user of the terminating device 102 may be referred to herein as the "called party". The telecommunications network 104 may represent a network comprising a plurality of network nodes disposed between the originating UE 100 and the terminating device 102. It is to be appreciated that the telecommunications network 104 can include any suitable types, and number, of network nodes to enable the transmission of IP multimedia over the telecommunications network 104. For example, the telecommunications network 104 may include, without limitation, various radio access networks (RANs) (e.g., eNodeB, cell towers, wireless access points, etc.), an evolved packet core (EPC), as well as a multimedia telephony (MMTel) and IP Multimedia Subsystem (IMS) architecture (sometimes referred to as the "IMS core network," the "IMS network," the "Core Network (CN)," or the "IM CN Subsystem"). The IMS is an architectural framework defined by the 3$^{rd}$ Generation Partnership Project (3GPP) for delivering IP multimedia to UEs, such as the originating UE 100 and the terminating device 102.

Various portions of the telecommunications network 104 can be maintained and/or operated by one or more service providers, such as one or more wireless carriers (sometimes referred to as "operators"), that provide IMS-based services to users (sometimes called "subscribers") who are associated with UEs for accessing the IMS-based services to which they have subscribed. For example, a service provider may offer multimedia telephony services that allow a subscribed user to call or message other users via the telecommunications network 104 using his/her UE, such as the originating UE 100. A user can also utilize an associated UE, such as the originating UE 100, to receive, provide, or otherwise interact with various different IMS-based services by accessing the IMS core of the telecommunications network 104. In this manner, a carrier may offer any type of IMS-based service, such as, telephony services, emergency services (e.g., E911), gaming services, instant messaging services, presence services, video conferencing services, social networking and sharing services, location-based services, push-to-talk services, WiFi calling services, RTT calling services, RTT video calling services, and so on. In order to access one or more of these services, an originating UE 100 is configured to request establishment of a communication session. Although many of the examples described herein relate to the originating UE 100 accessing RTT calling services in order to setup a communication session with a voice media stream and a RTT media stream, it is to be appreciated that the originating UE 100 may request establishment of any type of communication session. In addition, RTT can be used as an add-on service for any suitable type of communication session, such as RTT calling, RTT video calling, and so on.

Before requesting establishment of a communication session, both the originating UE 100 and the terminating device 102 can request registration for one or more IMS-based services while the devices 100/102 are in idle mode. Registration can involve identifying a proxy call session control function (P-CSCF) node of the telecommunications network 104, sending a registration request via a RAN (e.g., an LTE RAN) to the identified P-CSCF node, and receiving a response indicating a result of the registration request.

Session Initiation Protocol (SIP) may be used for transmitting SIP messages in the signaling portion of the communication session, as opposed to the data or media stream portion of the communication session. Such SIP messages may include, without limitation, registration messages, communication session messages, and the like, which are sent to the IMS core of the telecommunications network 104, and received therefrom. SIP is a signaling protocol that can be used to establish, modify, and terminate communication sessions over packet networks, and to authenticate access to IMS-based services. As used herein, a "SIP request" is a message that is sent from a UE 100/102 to the IMS core of the telecommunications network 104 using SIP protocol, and a "SIP response" is a message that is sent from the IMS core of the telecommunications network 104 to a UE 100/102 using SIP protocol.

When a user of the originating UE 100 wants to establish a communication session (e.g., a RTT call), the user may provide user input to the originating UE 100. Thus, FIG. 1 shows that the originating UE 100 receives user input at 106. The user input received at 106 can be provided in any suitable form known to a person having ordinary skill in the art, such as user input in the form of a voice command that is captured by a microphone of the originating UE 100 (e.g., "call 911"), user input in the form of touch input that is received via a touch screen of the originating UE 100, or that is received via physical keys or a keypad of the originating UE 100, user input in the form of a gesture that is captured by a camera of the originating UE 100, and so on. In an example, the user may initiate establishment of a communication session by providing touch-based user input to a touch screen of the originating UE 100, such as by dialing a phone number. It is to be appreciated that the originating UE 100 may be configured to present various options to the user for initiating any type of communication session supported by the originating UE 100, such as a normal voice call (e.g., a VoLTE call), an RTT call, a video call, and so on. If the user invokes a RTT calling function (e.g., by selecting a "RTT call" soft button presented on the touch screen of the originating UE 100), the to-be-established communication session may be a RTT call that combines voice and RTT media streams.

For illustrative purposes, consider a scenario where the terminating device 102 represents a PSAP that is "RTT-capable" by being configured to receive and send RTT messages from and to UEs over the telecommunications network 104. Such a PSAP may be configured to implement Next Generation (NG)-911 features to enable receipt of RTT messages. An RTT message may be sent during a RTT-based communication session using Real-time Transport Protocol (RIP) and user datagram protocol (UDP) to carry text content of the RTT media stream in packets that can be transmitted at a desired frequency (e.g., time sampled) to resemble real-time transmission. For example, the originating UE 100 may be configured to send RTT packets at a particular frequency (e.g., every second) in order to resemble a real-time conversation and near instantaneous display of the text content on the terminating device 102, as the calling party types a message on the originating LE 100, The Internet Engineering Task Force (IETF) Request for Comments (RFC) 4103 sets forth a technical specification for carrying text content of an RTT message in RTP packets. The Alliance for Telecommunication Industry Solutions (ATIS) 0700029 sets forth an additional technical specification for certain aspects of the mobile device behavior for handling RTT to facilitate communication between mobile devices (including emergency services) across multiple Commercial Mobile Service Providers (CMSPs). Unless otherwise specified, text content of an RTT message can be transmitted according to the IETF RFC 4103 and/or ATIS 0700029 specifications as part of a RTT media stream. Furthermore, FIG. 1 illustrates a scenario where a user is in an emergency situation and dials an emergency short code (e.g., 911 in the United States) to be connected to an emergency operator who may assist the user during the emergency. Accordingly, the originating UE 100 may receive user input at 106 in the form of an emergency short code, which causes a request for the communication session to be routed to an appropriate (e.g., nearest) PSAP, which is represented in FIG. 1 as the terminating device 102. It is to be appreciated that the calling party may invoke a RTT calling function (e.g., by selecting a "RTT call" soft button presented on the touch screen of the originating UE 100) to establish the emergency call as an RTT emergency call. Alternatively, the invocation of a traditional calling function (e.g., a "call" soft button) may automatically (e.g., due to pre-configured call settings of the originating UE 100) initiate an RTT call by requesting the establishment of a communication session that combines voice and RTT media streams.

In response to receiving the user input at 106, the originating UE 100 may attempt to establish a communication session. To establish the requested communication session, the originating UE 100 can send a session request 108 over the telecommunications network 104 (e.g., to the IMS core). The session request 108 can comprise a SIP message using the SIP INVITE method to request that a communication session be established with a terminating device 102; in the example of FIG. 1, the terminating device 102 is a nearest PSAP because the user dialed an emergency short code. Ultimately, the session request 108 can be forwarded to the terminating device 102, as shown in FIG. 1. Accordingly, the terminating device 102 (e.g., the nearest PSAP) receives the session request 108 (e.g., in the form of a SIP INVITE) requesting to establish a communication session.

The session request 108 may include a header that contains information indicating that the originating UE 100 supports RTT. This capability information can be used by particular nodes of the telecommunications network 104 and/or by the terminating device 102 to determine that the originating UE 100 is an RTT-capable device. The capability information included in the header can include one or more feature tags, at least one of the feature tags indicating that the originating UE 100 supports RTT. For example, a feature tag with a Feature_tag value='SIP Contact:text' may be included in a session request 108 header to indicate that the originating UE 100 supports RTT. It is to be appreciated that this capability can additionally, or alternatively, be sent by the originating UE 100 during a registration procedure, such as by including the aforementioned feature tag in a SIP REGISTER message (e.g., a header of the SIP REGISTER message), prior to the originating UE 100 receiving the user input at 106.

In some embodiments, the originating UE 100 may send a Session Description Protocol (SDP) offer 110 as part of the session request 108. For example, the SDP offer 110 may be included in a section of the session request 108 (e.g., a SIP INVITE), even though FIG. 1 shows the SDP offer 110 as a separate signal from the session request 108. Alternatively, the SDP offer 110 can be sent separately from the session request 108 (e.g., after the session request 108).

The SDP offer 110 may be used to negotiate initialization parameters for non-voice content (e.g., text content, image content, video content, etc.) that is to be transmitted during the RTT-based communication session. SDP is a format for describing streaming media initialization parameters. SDP does not deliver media itself, but is used between end points for negotiation of media type, format, and associated properties thereof. Here, the SDP offer 110 can be thought of as a signal that informs particular nodes of the telecommunications network 104 and/or the terminating device 102 that the originating UE 100 is RTT-capable and willing to make an RTT call, with attributes of the supported content (or media) types included in the SDP offer 110. In some examples, the SDP offer 110 may specify, among other things, the types of content (or media) that the originating UE 100 is offering to support during the communication session. For example, the SDP offer 110 can specify (as shown by reference 112 of FIG. 1) that the requested communication session is to support an exchange of both voice content via a voice media stream and non-voice content (e.g., text content) via a RTT media stream. The SDP offer 110 may specify support for voice content in an audio section of the SDP offer 110, along with attributes of the voice content that is to be supported. The SDP offer 110 may specify support for non-voice content in a different section(s) of the SDP offer 110, along with attributes of the non-voice content that is to be supported. In some embodiments, there may be individual sections in the SDP offer 110 for the attributes of text content, image content, and/or video content.

In addition to the types of content (or media) that are supported, the SDP offer 110 may also specify particular codecs that are to be supported, and one or more port numbers (e.g., Transmission Control Protocol (TCP) port numbers, User Datagram Protocol (UDP) port numbers, etc.) through which the supported types of content (e.g., voice content and non-voice content) are to be exchanged, where the port numbers specified in the SDP offer 110 correspond to network ports utilized by the originating UE 100.

As shown in FIG. 1, the terminating device 102 may respond to the session request 108 with its own setup procedures, such as sending a response 114 to the session request 108. FIG. 1 illustrates an example where both the originating UE 100 and the terminating device 102 support RTT (i.e., the exchange of both voice content via a voice media stream and non-voice content via a RTT media stream). As such, the response 114 to the session request 108 may include capability information indicating that the terminating device 102 also supports RTT. This capability information may be provided in a header of the response 114 (e.g., a response using the SIP OPTIONS method) sent by the terminating device 102 after receiving the session request 108. Again, this capability information included in the header of the response 114 can include one or more feature tags, at least one of the feature tags indicating that the terminating device 102 supports RTT. For example, a feature tag with a Feature_tag value='SIP Contact:text' may be included in a header of the response 114 to the session request 108, which may indicate that the terminating device 102 supports RTT. It is to be appreciated that this capability information can additionally, or alternatively, be sent by the terminating device 102 during a registration procedure, such as by including the aforementioned feature tag in a SIP REGISTER message (e.g., in a header of the SIP REGISTER message), prior to the terminating device 102 receiving the session request 108.

The terminating device 102 may also send a SDP answer 116 in response to the SDP offer 110. The SDP answer 116 may be sent by the terminating device 102 as part of the response 114 to session request 108. For example, the SDP answer 116 may be included in a section of the response 114 to the session request 108, even though FIG. 1 shows the SDP answer 116 as a separate signal from the response 114 to the session request 108. Alternatively, the SDP answer 116 can be sent separately from the response 114 to the session request 108 (e.g., after the response 114).

Similarly to the SDP offer 110, the SDP answer 116 may be used to negotiate initialization parameters for non-voice content (e.g., text content, image content, video content, etc.) that is to be transmitted during the RTT-based communication session. For example, the SDP answer 116 may specify, among other things, the types of content (or media) that the terminating device 102 is willing to support during the communication session. For example, the SDP answer 116 can specify voice content to be exchanged via a voice media stream and non-voice content (e.g., text content) to be exchanged via a RTT media stream. The SDP answer 116 may specify support for voice content in an audio section of the SDP answer 116, along with attributes of the voice content that is to be supported. The SDP answer 116 may specify support for non-voice content in a different section(s) of the SDP answer 116, along with attributes of the non-voice content that is to be supported. In some embodiments, there may be individual sections in the SDP answer 116 for the attributes of text content, image content, and/or video content.

In addition to the types of content (or media) that are supported, the SDP answer 116 may also specify particular codecs that are to be supported, and one or more port numbers (e.g., TCP port numbers, UDP port numbers, etc.) through which the supported types of content (e.g., voice content and non-voice content) are to be exchanged, where the port numbers specified in the SDP answer 116 correspond to network ports utilized by the terminating device 102.

Under normal operating conditions, each port value is set to a particular non-zero number during setup of a communication session to indicate a particular network port through which content is to be transmitted and/or received during the session. When an individual port value in the SDP answer 116 is set to zero, however, (as shown by reference 118 of FIG. 1), this may indicate that the telecommunications network 104 (or portions/nodes thereof) may not be properly configured to support RTT (i.e., the exchange of non-voice content via a RTT media stream). The port in question may be a "text port" for the exchange of RTT text. If the originating UE 100 receives a SDP answer 116 with a port value (e.g., of the text port for RTT text) set to zero, the originating UE 100 may determine that the communication session cannot be established with support for the exchange of non-voice content via a RTT media stream. Accordingly, if the originating UE 100 were to continue with its attempt to setup a RTT call, the originating UE 100 would be unsuccessful in establishing the communication session as a RTT call. Instead, the originating UE 100 may, in response to receiving a SDP answer 116 having a port value set to zero, determine that the communication session can be established as a communication session without support for the exchange of non-voice content via a RTT media stream, and the originating UE 100 may perform additional setup procedures 120 to ultimately establish the communication session as a voice-only call. The terminating device 102 may perform its own additional setup procedures 122 after sending the SDP answer 116. The additional setup procedures 120/122 may represent any type of setup procedures, in any suitable number, that may be performed to setup and establish the communication session as a voice-only call (e.g., a communication session without support for the exchange of non-voice content via a RTT media stream). Some examples of the additional setup procedures 120/122 include, without limitation, sending/receiving a session progress message (sometimes called a "183 response"), establishing a radio resource control (RRC) connection with a preferred RAT (e.g., an LTE RAT), establishing a dedicated bearer (e.g., a dedicated evolved packet system (EPS) bearer), sending/receiving a 100 Trying message (indicating the session request 108 has been received at the terminating device 102), sending/receiving a 180 Ringing message (indicating that a terminating party of the terminating device 102 is being alerted), sending/receiving an UPDATE message, sending/receiving various "ACK" message (e.g., a PRACK message), and so on. A person having ordinary skill in the art will readily recognize that additional setup procedures 120/122 are not limited to the examples described herein, and that other (e.g., different and/or additional) setup procedures may be performed in order to setup the communication session over a telecommunication network 104. Furthermore, some of the example setup procedures described herein may be omitted or unnecessary for setting up a primary communication session.

Eventually, the terminating device 102 can send a final 2xx response 124 (e.g., 200 (OK)) to establish the communication session at 126, assuming the setup of the communication session is successful. It is to be appreciated that, in the event that there is an issue with setting up the communication session, other types of final responses may be transmitted to resolve the session setup, such as a 4xx—client failure, a 5xx—server failure, or a 6xx—global failure. The communication session setup is not complete unless and until the terminating device 102 transmits a final response (e.g., a 2xx response 124, a 4xx response, a 5xx response, a 6xx response, etc.). Furthermore, the communication session is not established at 126 unless and until the terminating device 102 transmits a final response in the form of a 2xx response 124 (e.g., 200 (OK)). Notably, the communication session that is established at 126 does not support the exchange of the non-voice content (e.g., text content) via the RTT media stream. Thus, the communication session established at 126 can be considered to be a downgraded version of the communication session that was originally requested via the session request 108. During the communication session 126 the users of the respective devices 100/102 can communicate orally because the exchange of voice content via a voice media stream is supported, but the users cannot communicate using non-voice content (e.g., text content, image content, and/or video content, etc.) via a RTT media stream because the communication session was downgraded to voice-only support in response to the SDP answer 116 having a port value set to zero. "Voice-only," as used herein, is not meant to imply that the calling and called parties of the communication session cannot communicate in other non-oral ways, because standard text messaging applications (e.g., SMS) may be used for this purpose. "Voice-only," as used herein, means a RTT media stream is not supported for real-time transmission of text content, image content, and/or video content via the RTT media stream. By downgrading the communication session to voice-only, without support for the exchange of non-voice content via a RTT media stream, repeated attempts and subsequent failures to contact the called party may be reduced or eliminated, thereby conserving communications bandwidth resources and other resources. In addition, reliability of a telecommunications system is improved, which provides a good user experience by connecting the user. In emergency situations—where connecting the user's call is of the utmost importance—reliably connecting the user's call by downgrading can allow emergency responders to address an emergency situation quickly and effectively.

FIG. 1 further illustrates, at 128, that the originating UE 100 may output a notification indicating a lack of support for the exchange of the non-voice content via the RTT media stream. In this manner, a user of the originating UE 100 is informed of the inability to communicate using non-voice content (e.g., text content) during the communication session established at 126, which the user may have expected to be available had he/she not been informed at 128. The notification can be output at 128 via any suitable output device of the originating UE 100, such as a display (e.g., a pop-up visual notification presenting the notification in plain text), a speaker(s) (e.g., an audible notification using text-to-speech (TTS)), or any other suitable output device.

It is to be appreciated that the arrangement of the signaling in FIG. 1 is not necessarily meant to depict a particular order of the signaling that is to take place during the setup of a downgraded communication session. With this in mind, any given signal shown in FIG. 1 may occur before, during, or after any of the other specific signaling that is shown in FIG. 1.

Figure 2:
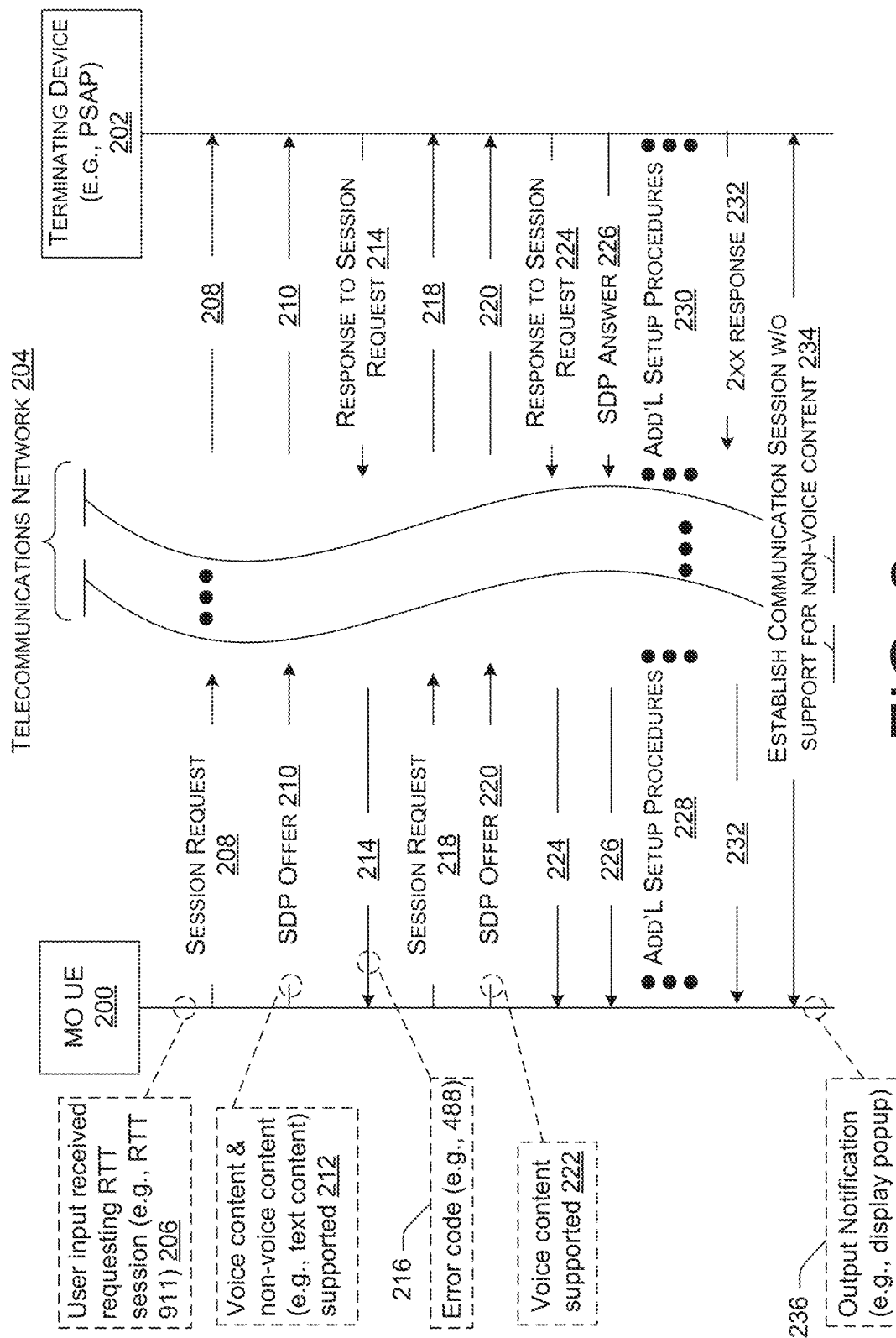
FIG. 2 is a diagram illustrating example signaling between an originating UE and a terminating device to establish a communication session by downgrading, according to another embodiment.

FIG. 2 is a diagram illustrating example signaling between an originating UE 200 and a terminating device 102 to establish a communication session over a telecommunications network 204 by downgrading, according to another embodiment.

In response to receiving, at 206, user input requesting to establish a RTT-based communication session (e.g., one that supports an exchange of voice content via a voice media stream and non-voice content via a RTT media stream), the originating UE 200 may attempt to establish a communication session with the terminating device 202 (e.g., an appropriate PSAP when the user dials an emergency short code) by sending a session request 208 over the telecommunications network 204. The session request 208 can comprise a SIP message using the SIP INVITE method to request that a communication session be established with the terminating device 202. The session request 208 may include a header that contains capability information indicating that the originating UE 200 supports RTT. The terminating device 202 may receive the session request 208 (e.g., in the form of a SIP INVITE) requesting to establish a communication session.

As shown in FIG. 2, the originating UE 200 may send a SDP offer 210 as part of the session request 208 (e.g., in a section of the session request 208), or separately from the session request 208 (e.g., after the session request 208). The SDP offer 210 can specify (as shown by reference 212 of FIG. 2) that the requested communication session is to support an exchange of both voice content via a voice media stream and non-voice content (e.g., text content) via a RTT media stream.

The terminating device 202 may respond to the session request 208. As shown in FIG. 2, the terminating device 202, or a node of the telecommunications network 204, may send a response 214 to the session request 208 that comprises an error code (as shown by reference 216 of FIG. 2). The error code may indicate that there is an issue with establishing the communication session altogether (e.g., the terminating device 202, the telecommunications network 204, or a portion/node(s) of the telecommunications network 204, may not be properly configured to support RTT-based communication sessions). An example error code that may be included in the response 214 to the session request 208 may comprise a 488 "Not Acceptable Here" error.

In response to receiving the response 214 to the session request 208 that comprises an error code, the originating UE 200 may initiate a "silent redial" procedure to establish a new communication session by automatically sending, without user intervention, a new session request 218 over the telecommunications network 204. Prior to sending the new session request 218, the originating UE 200 may send a message to terminate the setup of the initial communication session. The session request 218 can comprise a SIP message using the SIP INVITE method to request that the new communication session be established with the terminating device 202. The session request 208 may include a header that omits capability information indicating that the originating UE 200 supports RTT, seeing as how the new communication session is to be downgraded to a voice-only call, without support for the exchange of non-voice content via a RTT media stream. The terminating device 202 may receive the new session request 218 (e.g., in the form of a SIP INVITE) requesting to establish the new communication session as a voice-only call.

The originating UE 200 may send a new SDP offer 220 as part of the new session request 218 (e.g., in a section of the session request 218), or separately from the session request 218 (e.g., after the session request 218). The new SDP offer 220 can specify (as shown by reference 222 of FIG. 2) that the requested new communication session is to support an exchange of voice content via a voice media stream, but not non-voice content (e.g., text content) via a RTT media stream.

The terminating device 202 may respond to the new session request 218 with a response 224 to the session request 108. Because the new communication session is requested as a voice-only call, the response 224 may omit capability information indicating that the terminating device 202 supports RTT, even if it is a RTT capable device.

The terminating device 202 may also send a SDP answer 226 in response to the new SDP offer 220. The SDP answer 226 may be sent by the terminating device 202 as part of the response 224 to new session request 218 (e.g., in a section of the response 224), or separately from the response 224 to the new session request 218 (e.g., after the response 224). Again, since the requested communication session is requesting support for the exchange of voice content via a voice media stream, without support for the exchange of non-voice content via a RTT media stream, the SDP answer 226 can specify support for the exchange of voice content via a voice media stream, along with attributes of the voice content that is to be supported, as well as a supported codec(s), and one or more port numbers through which the voice content is to be exchanged.

The originating UE 200 and the terminating device 202 may perform additional setup procedures 228 and 230, respectively, to ultimately establish the new communication session as a voice-only call. Eventually, the terminating device 202 can send a final 2xx response 232 (e.g., 200 (OK)) to establish the new communication session at 234, assuming the setup of the new communication session is successful. Notably, the new communication session that is established at 234 does not support the exchange of the non-voice content (e.g., text content) via the RTT media stream. Thus, the new communication session established at 234 can be considered to be downgraded as compared to the originally-requested communication session that was to include support for the exchange of non-voice content via a RTT media stream. During the new communication session 234, the users of the respective devices 200/202 can communicate orally because the exchange of voice content via a voice media stream is supported, but the users cannot communicate using non-voice content (e.g., text content, image content, and/or video content, etc.) via a RTT media stream because the communication session was downgraded to voice-only support in response to the error code included in the first response 214 to the first session request 208. By downgrading in the new communication session to voice-only support (without support for the exchange of non-voice content via a RTT media stream), repeated attempts and subsequent failures to contact the called party may be reduced or eliminated, thereby conserving communications bandwidth resources and other resources. In addition, reliability of a telecommunications system is improved, which provides a good user experience by connecting the user. In emergency situations—where connecting the user's call is of the utmost importance—reliably connecting the user's call by downgrading can allow emergency responders to address an emergency situation quickly and effectively.

FIG. 2 further illustrates, at 236, that the originating UE 200 may output a notification indicating a lack of support for the exchange of the non-voice content via the RTT media stream. In this manner, a user of the originating UE 200 is informed of the inability to communicate using non-voice content (e.g., text content) during the communication session established at 234, which the user may have expected to be available had he/she not been informed at 236.

It is to be appreciated that the arrangement of the signaling in FIG. 2 is not necessarily meant to depict a particular order of the signaling that is to take place during the setup of a downgraded communication session. With this in mind, any given signal shown in FIG. 2 may occur before, during, or after any of the other specific signaling that is shown in FIG. 2.

Figure 3:
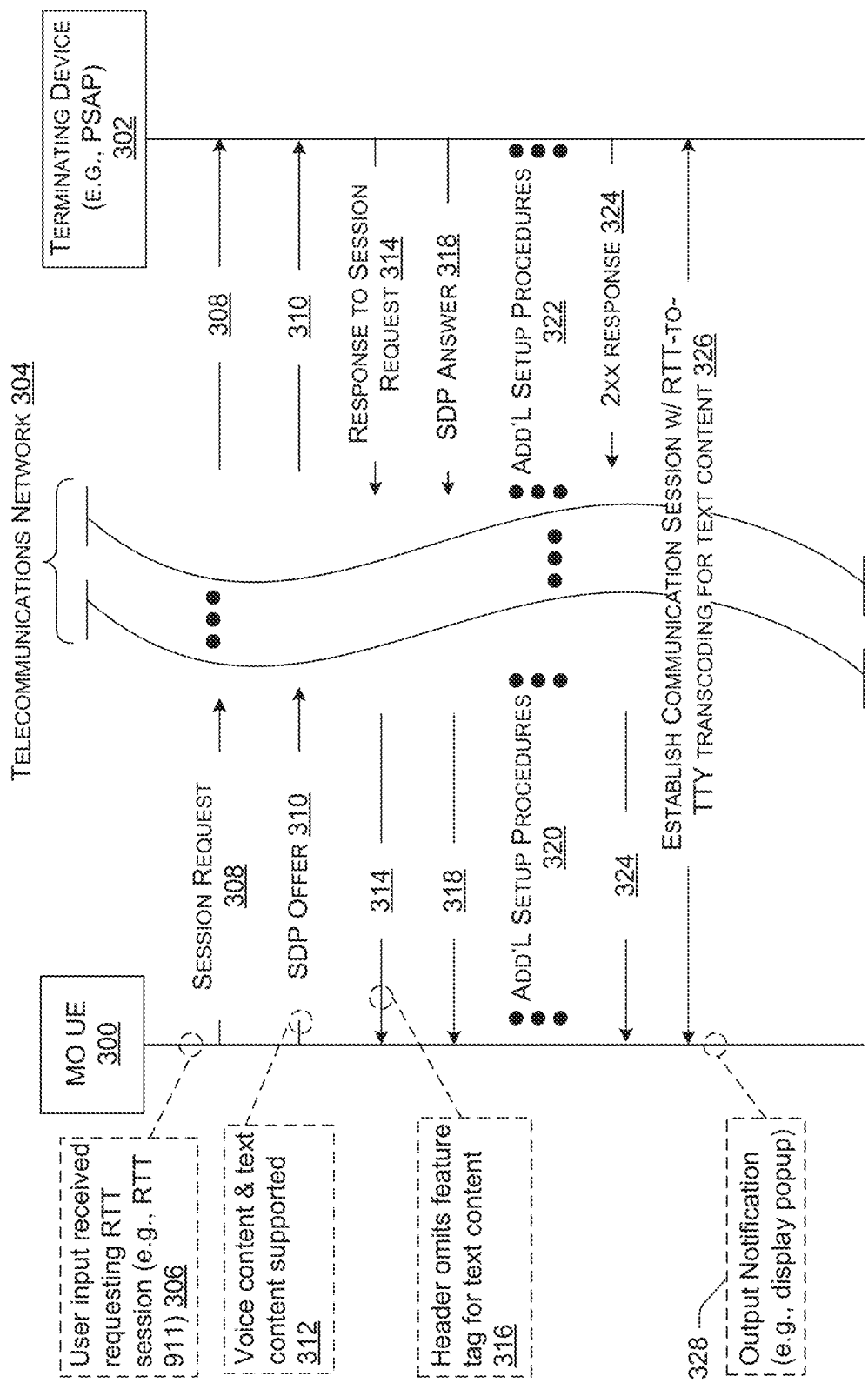
FIG. 3 is a diagram illustrating example signaling between an originating UE and a terminating device to establish a communication session by downgrading, according to another embodiment.

FIG. 3 is a diagram illustrating example signaling between an originating UE 300 and a terminating device 302 to establish a communication session over a telecommunications network 304 by downgrading, according to another embodiment.

In response to receiving, at 306, user input requesting to establish a RTT-based communication session (e.g., one that supports an exchange of voice content via a voice media stream and text content via a RTT media stream), the originating UE 300 may attempt to establish a communication session with the terminating device 302 (e.g., an appropriate PSAP when the user dials an emergency short code) by sending a session request 308 over the telecommunications network 304. The session request 308 can comprise a SIP message using the SIP INVITE method to request that a communication session be established with the terminating device 302. The session request 308 may include a header that contains capability information indicating that the originating UE 300 supports RTT. The terminating device 302 may receive the session request 308 (e.g., in the form of a SIP INVITE) requesting to establish a communication session.

As shown in FIG. 3, the originating UE 300 may send a SDP offer 310 as part of the session request 308 (e.g., in a section of the session request 308), or separately from the session request 308 (e.g., after the session request 308). The SDP offer 310 can specify (as shown by reference 312 of FIG. 3) that the requested communication session is to support an exchange of both voice content via a voice media stream and text content via a RTT media stream.

The terminating device 302 may respond to the session request 308 by sending a response 314 to the session request 308 that includes a header with capability information associated with the terminating device 302. In the example of FIG. 3, as shown by reference 316, the capability information provided in the header of the response 314 (e.g., a response using the SIP OPTIONS method) may omit a feature tag expected by the originating UE 300. The feature tag omitted in the header of the response 314 may be a feature tag that can be used to indicate that the terminating device 302 supports RTT (e.g., the exchange of text content via a RTT media stream. For example, the header of the response 314 to the session request 308 may omit a feature tag with a Feature_tag value='SIP Contact:text', which may indicate that the terminating device 302 does not support RTT. This may be the case when the telecommunications network 304 supports RTT, but the terminating device 302 does not support RTT. For instance, the terminating device 302 may represent a PSAP terminal that does not support RTT calls, but merely supports Teletypewriter (TTY) technology; a technology developed in the 1960's to allow the hearing and speech impaired to communicate using text over standard telephone lines, which was later implemented in wireless circuit-switched networks for use with mobile handsets. In the example of FIG. 3, one or more nodes of the telecommunications network 304 may be configured to transcode RTT signaling and/or messaging into TTY format, thereby enabling the terminating device 302 (e.g., a TTY-capable PSAP) to handle the incoming RTT messages as a TTY message. Although a called party associated with the terminating device 302 (e.g., a 911 operator) may not know whether the incoming call is from a TTY device or a RTT device, the originating UE 300 may determine, from the omission of the expected feature tag in the header of the response 314 to the session request 308, that the communication session may be established, but the communication session will not be able to support a full set of features originally requested by the originating UE 302. For example, the communication session may not support the simultaneous exchange of text content via a RTT media stream between the devices 300/302, as is the case with a RTT call. As another example, the communication session may not support the simultaneous exchange of voice content via a voice media stream and text content via a RTT media stream, as is the case with a RTT call.

The terminating device 302 may also send a SDP answer 318 in response to the SDP offer 310. The SDP answer 318 may be sent by the terminating device 302 as part of the response 314 to session request 308 (e.g., in a section of the response 314), or separately from the response 314 to the session request 308 (e.g., after the response 314). Since the terminating device 302 is voice-capable, but not RTT-capable, in the example of FIG. 3, the SDP answer 318 can specify support for the exchange of voice content via a voice media stream, along with attributes of the voice content that is to be supported, as well as a supported codec(s), and one or more port numbers through which the voice content is to be exchanged.

The originating UE 300 and the terminating device 302 may perform additional setup procedures 320 and 322, respectively, to ultimately establish the communication session as a voice-only call. Eventually, the terminating device 302 can send a final 2xx response 324 (e.g., 200 (OK)) to establish the communication session at 326, assuming the setup of the communication session is successful. Notably, the communication session that is established at 326 supports the exchange of the text content by allowing the originating UE 300 to send RTT messages that include text content, with one or more nodes of the telecommunications network 304 performing RTT-to-TTY transcoding so that the terminating device 302 receives the text content as a TTY message. However, the communication session established at 326 can be considered to be downgraded as compared to the originally-requested communication session because the originally-requested communication session was to include support for the simultaneous exchange of text content via a RTT media stream (e.g., an RTT call allows both parties of a communication session to type concurrently, such as by allowing one user to interrupt the other user), as well as support for the simultaneous exchange of voice content via a voice media stream and text content via a RTT media stream (e.g., talk and text at the same time, as part of the same communication session). These expected features are not supported in the downgraded version of the communication session that is established at 326. Thus, during the communication session 326, the users of the respective devices 300/302 can communicate orally and via text (with RTT-to-TTY transcoding performed within the telecommunications network 304), but the users cannot utilize a full set of features, such as simultaneous exchange of text via a RTT media stream, and/or the simultaneous exchange of voice and text, because the communication session was established between a RTT-capable device 300 and a RTT-incapable device 302.

FIG. 3 further illustrates, at 328, that the originating UE 300 may output a notification indicating a lack of support for a full set of features typically expected with a RTT-based communication session. In this manner, a user of the originating UE 300 is informed of the inability called party to communicate using typical RTT features, which the user may have expected to be available had he/she not been informed at 328.

It is to be appreciated that the arrangement of the signaling in FIG. 3 is not necessarily meant to depict a particular order of the signaling that is to take place during the setup of a downgraded communication session. With this in mind, any given signal shown in FIG. 3 may occur before, during, or after any of the other specific signaling that is shown in FIG. 3.

Figure 4:
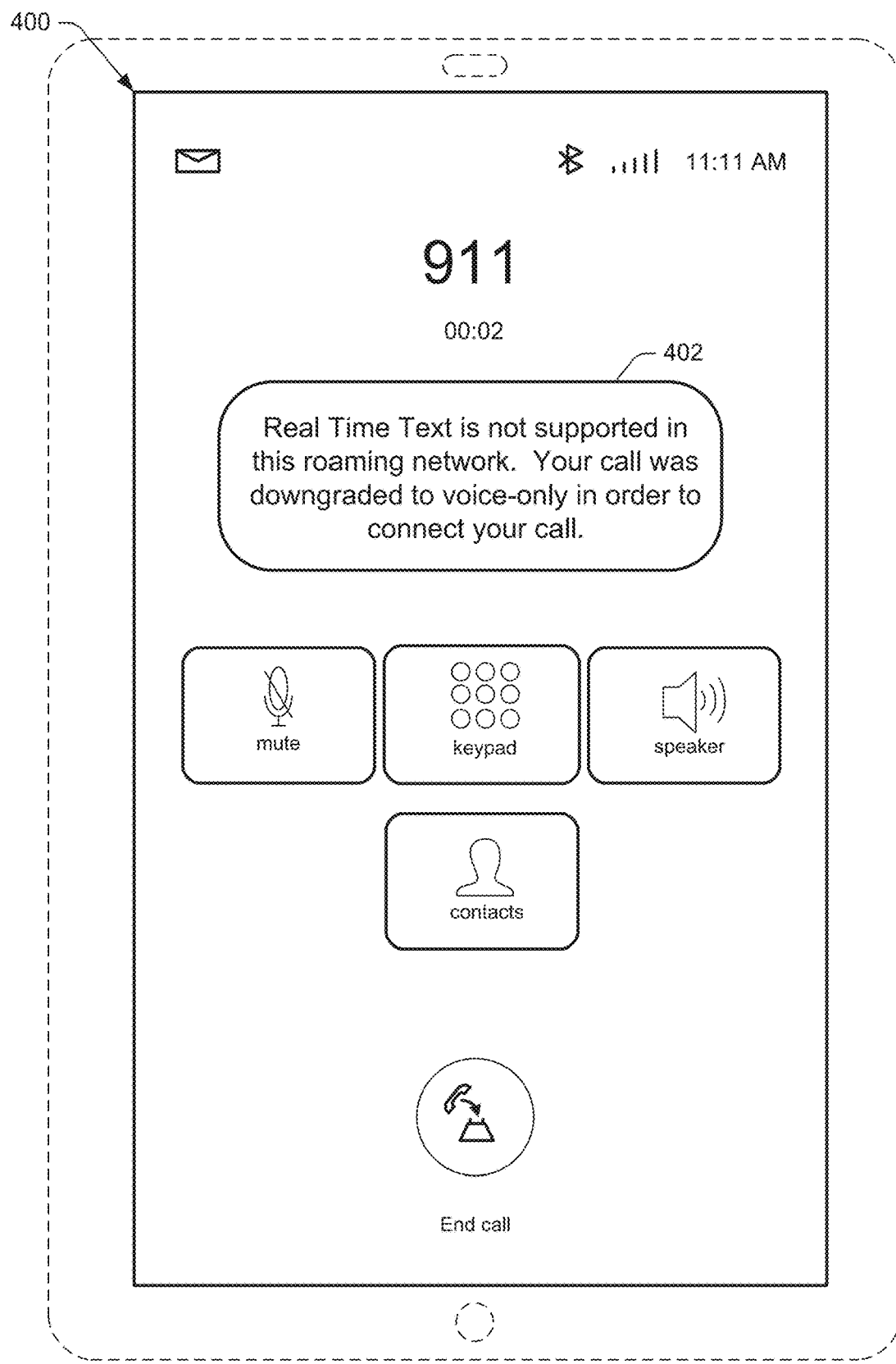
FIG. 4 illustrates an example user interface of an originating UE that is displayed after establishing a downgraded version of a communication session that does not support the exchange of non-voice content via an RTT media stream requested for the original communication session, the user interface presenting a user notification indicating a lack of support for the exchange of non-voice content via the RTT media stream.

FIG. 4 illustrates an example user interface 400 of an originating UE 100 that is displayed after establishing a downgraded version of a communication session that does not support the exchange of non-voice content via an RTT media stream, which had been requested for an original communication session. For example, the user interface 400 may represent a screen that is presented on the originating UE 100 at 128 of FIG. 1, after establishing a downgraded version of a communication session that does not support the exchange of non-voice content (e.g., text content) via a RTT media stream. Said another way, a user of the originating UE 100 may have dialed 911 as a RTT call, expecting to have RTT functionality available during the RTT call, but the communication session was established as a downgraded version of the originally-requested communication session (e.g., a voice-only call).

In order to inform the user of the downgrade that occurred automatically, without user intervention, the user interface 400 is shown as including a visual notification 402 indicating the lack of support for the exchange of non-voice content via an RTT media stream. An example visual notification 402 may read "Real Time Text is not supported in this roaming network. Your call was downgraded to voice-only in order to connect your call." The visual notification 402 may be a pop-up notification, a banner notification, or any other type of push notification known to a person having ordinary skill in the art. It is to be appreciated that, although the example of FIG. 4 depicts a visual notification that is presented on a display of the originating UE 100, other types of notifications (e.g., audible, tactile, etc.) are contemplated herein to be used in combination with a visual notification 402, or as an alternative to a visual notification 402, without departing from the basic characteristics of the techniques and systems described herein.

Figure 5:
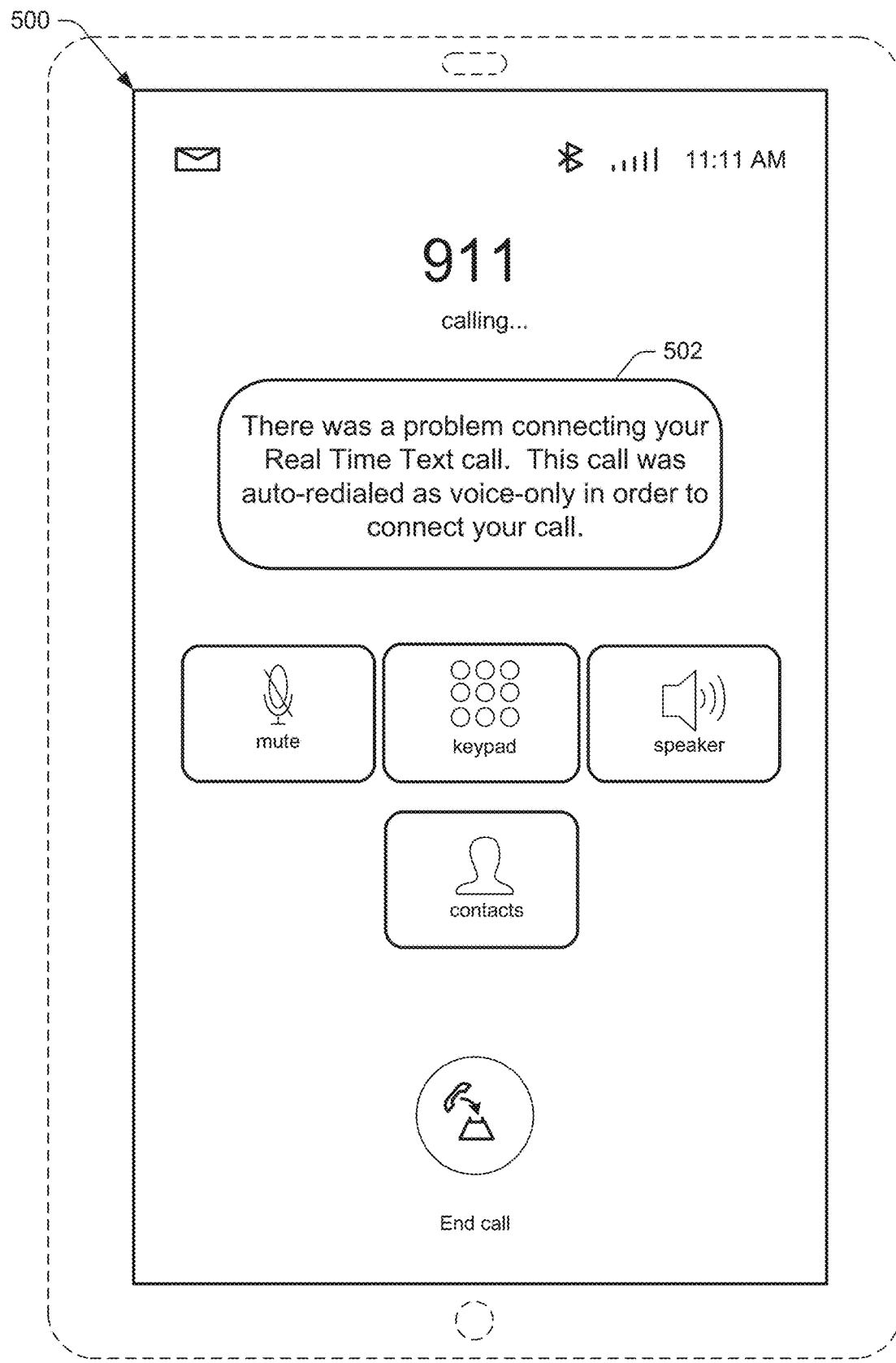
FIG. 5 illustrates an example user interface of an originating UE that is displayed while, and/or after, establishing a new communication session that does not support the exchange of non-voice content via an RTT media stream requested for the original communication session, the user interface presenting a user notification indicating a lack of support for the exchange of non-voice content via the RTT media stream.

FIG. 5 illustrates an example user interface 500 of an originating UE 200 that is displayed while, and/or after, establishing a new communication session that does not support the exchange of non-voice content via an RTT media stream, which had been requested for an original communication session. For example, the user interface 500 may represent a screen that is presented on the originating UE 200 at 236 of FIG. 2, during, and/or after, setup of a new communication session that was downgraded so as to not support the exchange of non-voice content (e.g., text content) via a RTT media stream. Said another way, a user of the originating UE 200 may have dialed 911 as a RTT call, expecting to have RTT functionality available during the RTT call, but the communication session was established (by silent redial) as a new communication session that is downgraded as compared to the features requested for the original communication session.

In order to inform the user of the downgrade that occurred automatically, via silent redial and without user intervention, the user interface 500 is shown as including a visual notification 502 indicating the lack of support for the exchange of non-voice content via an RTT media stream. An example visual notification 502 may read "There was a problem connecting your Real Time Text call. This call was auto-redialed as voice-only in order to connect your call." The visual notification 502 may be a pop-up notification, a banner notification, or any other type of push notification known to a person having ordinary skill in the art. It is to be appreciated that, although the example of FIG. 5 depicts a visual notification that is presented on a display of the originating UE 200, other types of notifications (e.g., audible, tactile, etc.) are contemplated herein to be used in combination with a visual notification 502, or as an alternative to a visual notification 502, without departing from the basic characteristics of the techniques and systems described herein.

Figure 6:
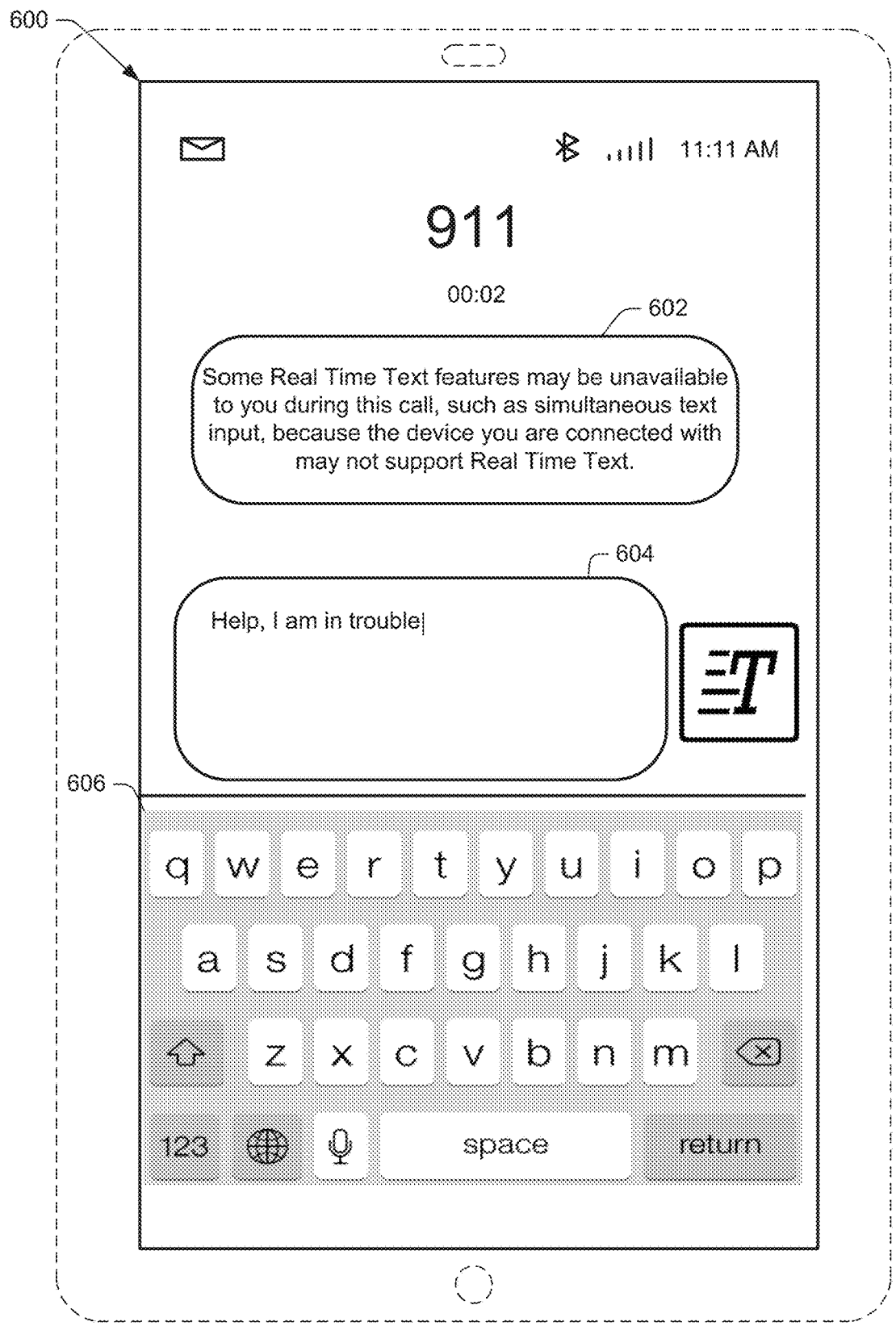
FIG. 6 illustrates an example user interface of an originating UE that is displayed after establishing a downgraded version of a communication session that does not support a full set of RTT features requested for the original communication session, the user interface presenting a user notification indicating a lack of support for some RTT features.

FIG. 6 illustrates an example user interface 600 of an originating UE 300 that is displayed after establishing a downgraded version of a communication session that does not support a full set of RTT features, which were requested for an original communication session. For example, the user interface 600 may represent a screen that is presented on the originating UE 300 at 328 of FIG. 3, after establishing a downgraded version of a communication session that does not support a full set of RTT features. Said another way, a user of the originating UE 300 may have dialed 911 as a RTT call, expecting to have full, unencumbered RTT functionality available during the RTT call, but the communication session was established as a downgraded version of the originally-requested communication session.

In order to inform the user of the downgrade that occurred automatically, without user intervention, the user interface 600 is shown as including a visual notification 602 indicating the lack of support for a full set of RTT features, as described in more detail above with respect to FIG. 3. An example visual notification 602 may read "Some Real Time Text features may be unavailable to you during this call, such as simultaneous text input, because the device you are connected with may not support Real Time Text." The visual notification 602 may be a pop-up notification, a banner notification, or any other type of push notification known to a person having ordinary skill in the art. It is to be appreciated that, although the example of FIG. 6 depicts a visual notification that is presented on a display of the originating UE 300, other types of notifications (e.g., audible, tactile, etc.) are contemplated herein to be used in combination with a visual notification 602, or as an alternative to a visual notification 602, without departing from the basic characteristics of the techniques and systems described herein.

FIG. 6 further illustrates a non-voice content entry field 604 that can be used to insert non-voice content, such as text content, image content, and/or video content for transmission via a RTT message. For instance, a soft keyboard 606 may be presented in the user interface 600, for use by a user to type a message in the content entry field 604 as text content. The user is in the midst of typing a message in FIG. 6, which appears on a display of the terminating device 302 in real-time, as the user of the originating UE 300 types the message, enabled by RTT-to-TTY transcoding by one or more nodes of the telecommunications network 304.

It is to be appreciated that the user interfaces 400, 500, and 600 are merely exemplary for illustrative purposes, and that other similar user interfaces may be presented for the various other scenarios described herein.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 7:
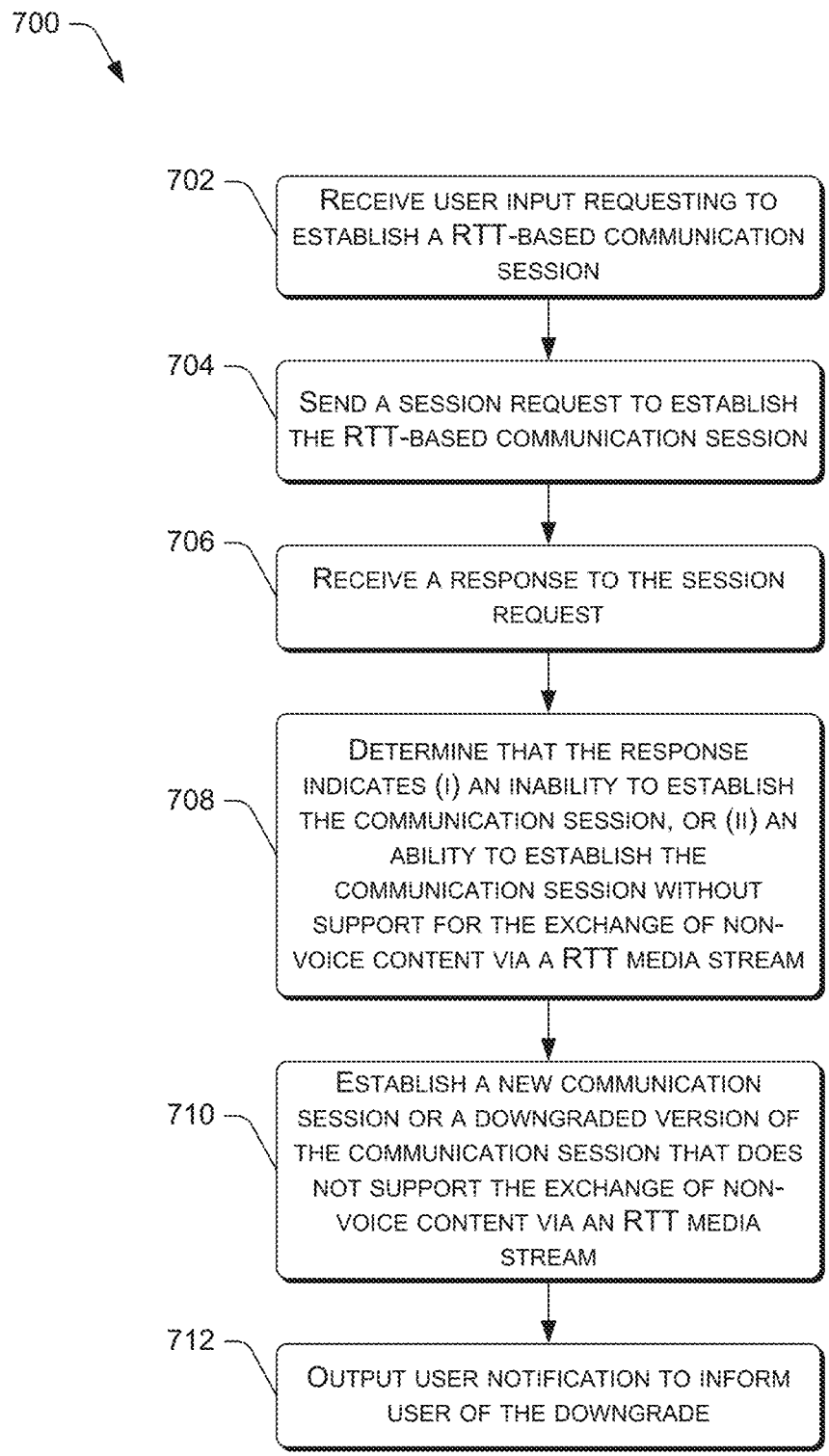
FIG. 7 illustrates a flowchart of an example process for establishing a communication session by downgrading.

FIG. 7 illustrates a flowchart of an example process 700 for establishing a communication session by downgrading. The process 700 may be implemented by an originating UE, such as the originating UE 100 or 200 of FIGS. 1 and 2. The process 700 is described, by way of example, with reference to the previous figures.

At 702, an originating UE 100/200 may receive user input requesting to establish a RTT-based communication session (e.g., a communication session that supports an exchange of (i) voice content via a voice media stream and (ii) non-voice content via a real time text (RTT) media stream). As described, the user input may be provided in various ways via any suitable input mechanism enabled by the originating UE 100/200. In the case of an emergency call, the user input may be in the form of an emergency short code (e.g., 911 in the United States) and a selection of a RTT call button, or a general call button where the originating UE 100/200 is preconfigured to initiate setup for any call as a RTT call.

At 704, the originating UE 100/200 may send, over a telecommunications network 104/204, a session request 108/208 to establish the RTT communication session. This may be in the form of a SIP INVITE. The session request 108/208 may be ultimately forwarded to a terminating device 102/202 (e.g., an appropriate PSAP).

At 706, the originating UE 100/200 may receive a response 114/214 to the session request 108/208 over the telecommunications network 104/204.

At 708, the originating UE 100/200 may determine that the response 114/214 to the session request 108/208 indicates at least one of (i) an inability to establish the communication session, or (ii) an ability to establish the communication session without support for the exchange of the non-voice content via the RTT media stream. The originating UE 200 may determine that the response 214 indicates an inability to establish the communication session based at least in part on an error code (e.g., a 488 error code) included in the response 214 to the session request 208, as described with reference to FIG. 2. The originating UE 100 may alternatively determine that the response 114 indicates an ability to establish the communication session without support for the exchange of the non-voice content via the RTT media stream based at least in part on a SDP answer included in the response 114 having a port value set to zero, as described with reference to FIG. 1.

At 710, the originating UE 100/200 may establish, without user intervention, a new communication session or a downgraded version of the communication session over the telecommunications network 104/204, wherein the new communication session or the downgraded version of the communication session does not support the exchange of the non-voice content via the RTT media stream. In other words, a "voice-only" call may be established at block 710, which does not allow the user to send non-voice content (e.g., text content) via a RTT media stream, yet allows the user to communicate orally with the called party. In the case of the error code indicative of the inability to establish the communication session, a new communication session may be established at block 710, which is downgraded as compared to the features requested in the original communication session. In the case of the SDP answer having a port value set to zero, which is indicative of the ability to establish the communication session without support for the exchange of the non-voice content via the RTT media stream, the communication session may be automatically downgraded and established as a downgraded version of the communication session at block 710.

At 712, the originating UE 100/200 may output, via an output device (e.g., a display, speaker(s), etc.), a notification (visible, audible, etc.) indicating a lack of support for the exchange of the non-voice content.

Figure 8:
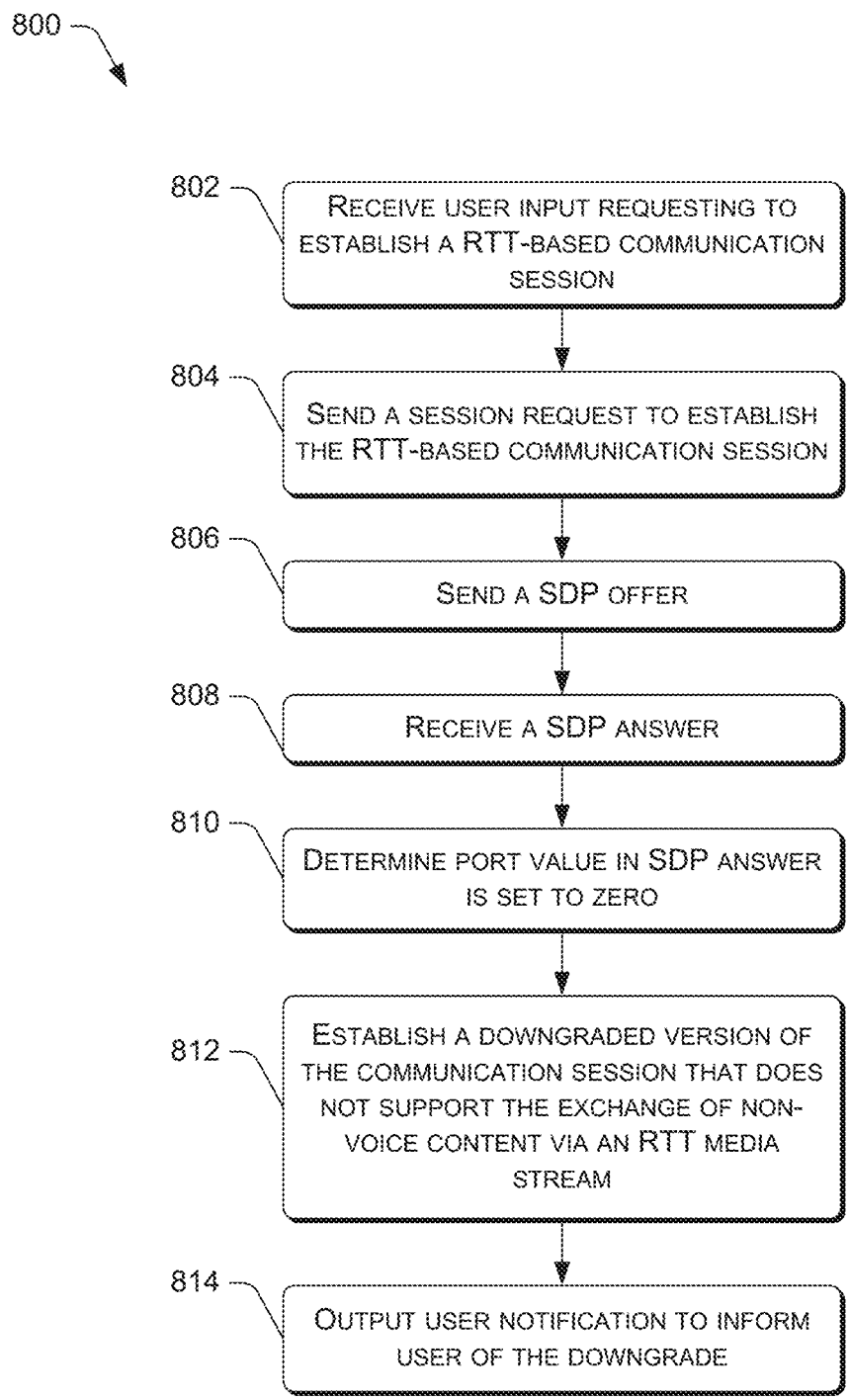
FIG. 8 illustrates a flowchart of an example process for establishing a communication session by downgrading based on a SDP answer having a port value set to zero.

FIG. 8 illustrates a flowchart of an example process 800 for establishing a communication session by downgrading based on a SDP answer 116 having a port value set to zero. The process 800 may be implemented by an originating UE, such as the originating UE 100 of FIG. 1. The process 800 is described, by way of example, with reference to the previous figures.

At 802, an originating UE 100 may receive user input requesting to establish a RTT-based communication session (e.g., a communication session that supports an exchange of (i) voice content via a voice media stream and (ii) non-voice content via a real time text (RTT) media stream). The operation(s) at block 802 may be similar to the operation(s) described with respect to block 702 of the process 700 of FIG. 7.

At 804, the originating UE 100 may send, over a telecommunications network 104, a session request 108 to establish the RTT communication session. The operation(s)

at block 804 may be similar to the operation(s) described with respect to block 704 of the process 700 of FIG. 7.

At 806, the originating UE 100 may send, over the telecommunications network 104, a SDP offer 110 to negotiate initialization parameters for non-voice content of the RTT communications session.

At 808, the originating UE 100 may receive, over the telecommunications network 104, a SDP answer 116. The SDP answer 116 may be received as part of a response 114 to the session request 108.

At 810, the originating UE 100 may determine that a port value in the SDP answer 116 is set to zero, indicating an inability to establish the communication session with support for the exchange of the non-voice content via the RTT media stream (or conversely, an ability to establish the communication session without support for the exchange of the non-voice content via the RTT media stream).

At 812, the originating UE 100 may establish, without user intervention, a downgraded version of the communication session over the telecommunications network 104, wherein the downgraded version of the communication session does not support the exchange of the non-voice content via the RTT media stream. The operation(s) at block 812 may be similar to the operation(s) described with respect to block 710 of the process 700 of FIG. 7. In some embodiments, the originating UE 100 may receive a 2xx response 124 indicating a successful connection with a terminating device 102 prior to establishing the downgraded version of the communication session at block 812.

At 814, the originating UE 100 may output, via an output device (e.g., a display, speaker(s), etc.), a notification (visible, audible, etc.) indicating a lack of support for the exchange of the non-voice content. The operation(s) at block 814 may be similar to the operation(s) described with respect to block 712 of the process 700 of FIG. 7.

Figure 9:
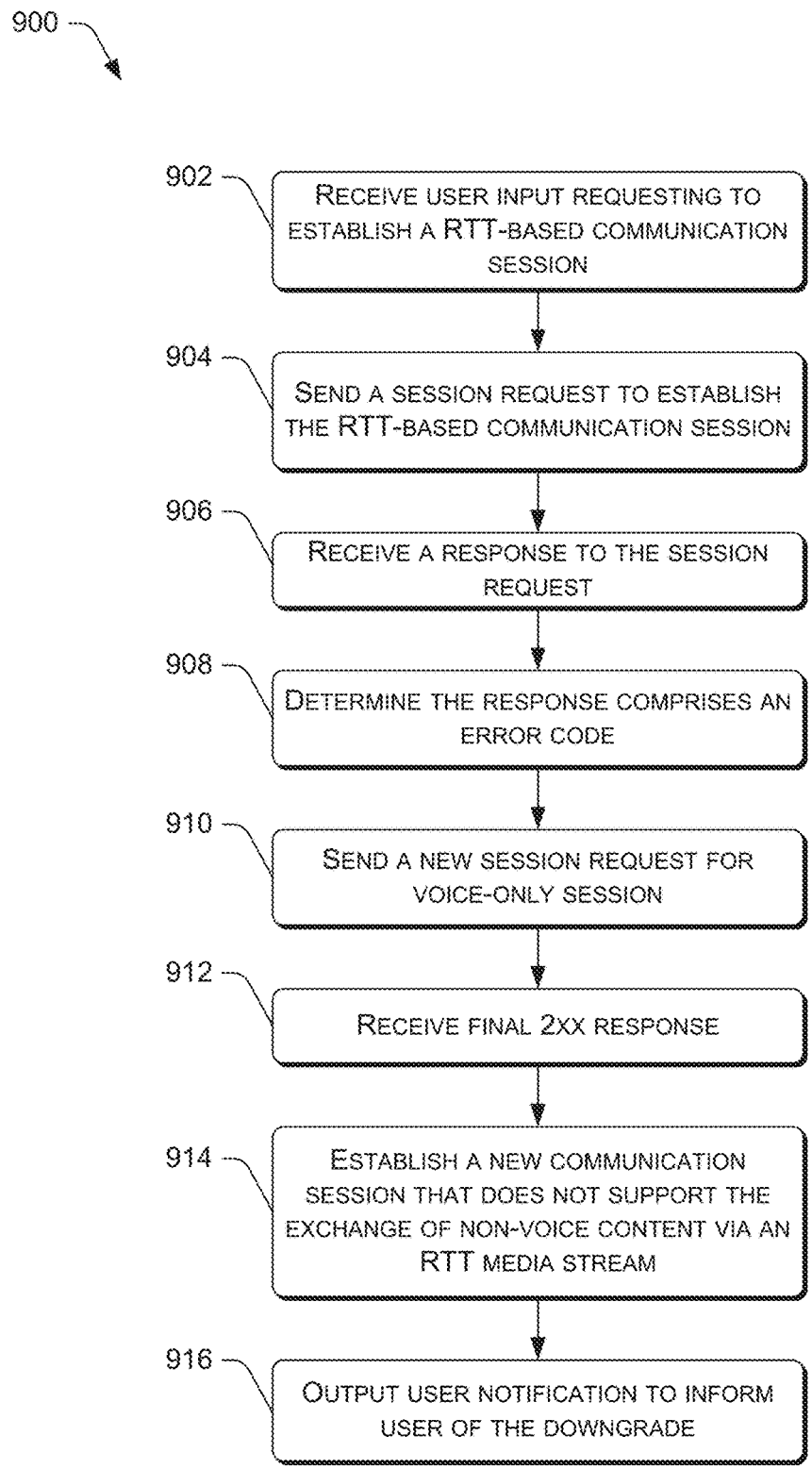
FIG. 9 illustrates a flowchart of an example process for establishing a communication session by downgrading based on a response to a session request comprising an error code.

FIG. 9 illustrates a flowchart of an example process 900 for establishing a communication session by downgrading based on a response to a session request comprising an error code. The process 900 may be implemented by an originating UE, such as the originating UE 200 of FIG. 2. The process 900 is described, by way of example, with reference to the previous figures.

At 902, an originating UE 200 may receive user input requesting to establish a RTT-based communication session (e.g., a communication session that supports an exchange of (i) voice content via a voice media stream and (ii) non-voice content via a real time text (RTT) media stream). The operation(s) at block 902 may be similar to the operation(s) described with respect to blocks 702/802 of the process 700/800 of FIG. 7/8.

At 904, the originating UE 200 may send, over a telecommunications network 204, a session request 208 to establish the RTT communication session. The operation(s) at block 904 may be similar to the operation(s) described with respect to block 704/804 of the process 700/800 of FIG. 7/8.

At 906, the originating UE 200 may receive a response 214 to the session request 208 over the telecommunications network 204. The operation(s) at block 906 may be similar to the operation(s) described with respect to block 706 of the process 700 of FIG. 7.

At 908, the originating UE 200 may determine that the response 214 to the session request 208 comprises an error code (e.g., a 488 error code).

At 910, the originating UE 200 may send, over a telecommunications network 204 and without user intervention, a new session request 218 to establish a voice-only communication session. This may be in the form of a SIP INVITE. The new session request 218 may be ultimately forwarded to a terminating device 202 (e.g., an appropriate PSAP). In some embodiments, the new session request 218 may include, or the originating UE 200 may send separately, a SDP offer 220 that specifies that voice content is supported. The SDP offer 220 may not specify support for non-voice content to be exchanged via a RTT media stream.

At 912, and possibly after one or more intermediate setup procedures, the originating UE 200 may receive a final 2xx response 232 indicating a successful connection with a terminating device 202.

At 914, the originating UE 200 may establish a new communication session over the telecommunications network 204, wherein the new communication session does not support the exchange of the non-voice content via the RTT media stream. The operation(s) at block 914 may be similar to the operation(s) described with respect to block 710 of the process 700 of FIG. 7.

At 916, the originating UE 200 may output, via an output device (e.g., a display, speaker(s), etc.), a notification (visible, audible, etc.) indicating a lack of support for the exchange of the non-voice content. The operation(s) at block 916 may be similar to the operation(s) described with respect to block 712/814 of the process 700/800 of FIG. 7/8.

Figure 10:
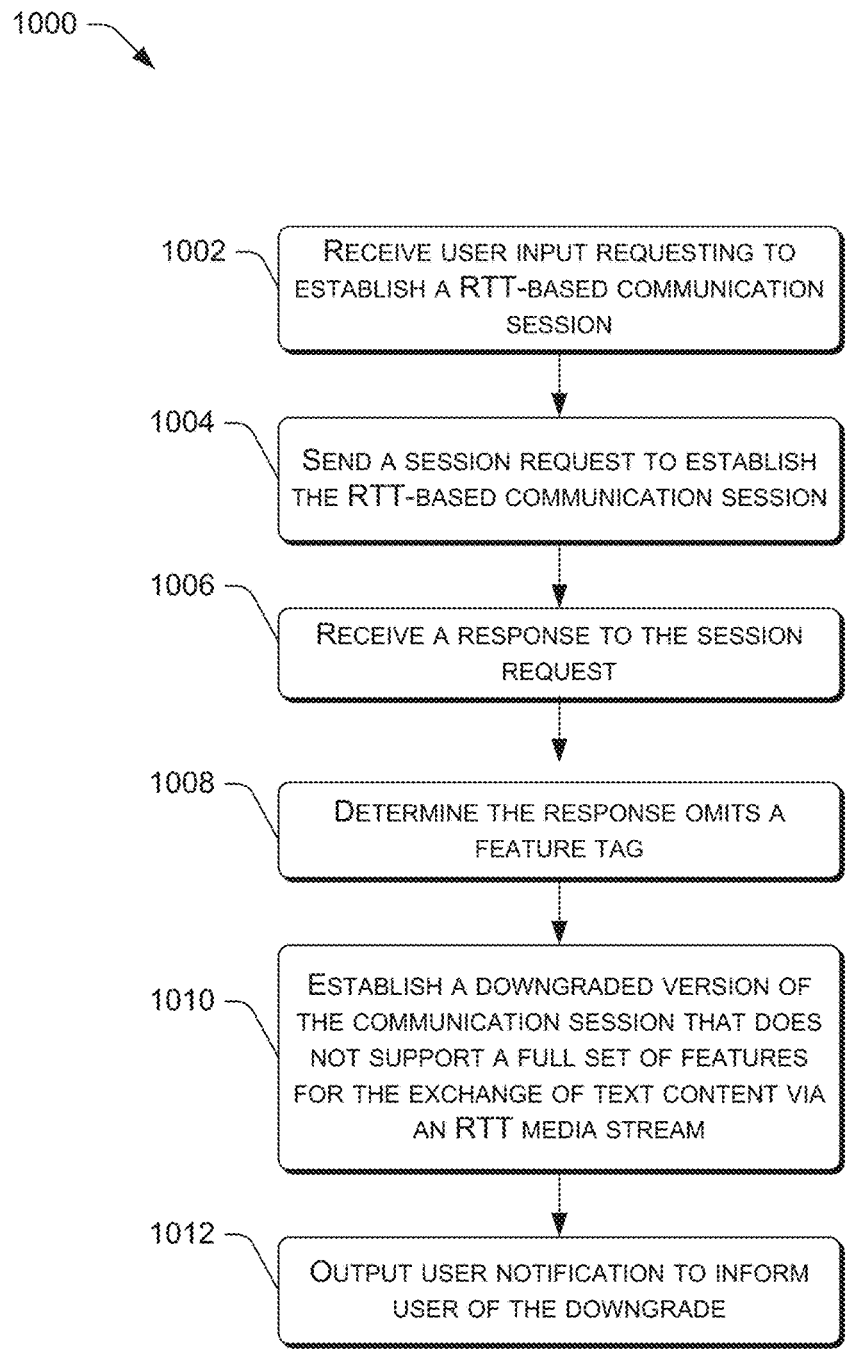
FIG. 10 illustrates a flowchart of an example process for establishing a communication session by downgrading based on an omission of a feature tag in a response to a session request.

FIG. 10 illustrates a flowchart of an example process 1000 for establishing a communication session by downgrading based on an omission of a feature tag in a response to a session request. The process 1000 may be implemented by an originating UE, such as the originating UE 300 of FIG. 3. The process 1000 is described, by way of example, with reference to the previous figures.

At 1002, an originating UE 300 may receive user input requesting to establish a RTT-based communication session (e.g., a communication session that supports an exchange of (i) voice content via a voice media stream and (ii) non-voice content via a real time text (RTT) media stream). The operation(s) at block 1002 may be similar to the operation(s) described with respect to blocks 702/802/902 of the process 700/800/900 of FIG. 7/8/9.

At 1004, the originating UE 300 may send, over a telecommunications network 304, a session request 308 to establish the RTT communication session. The operation(s) at block 1004 may be similar to the operation(s) described with respect to block 704/804/904 of the process 700/800/900 of FIG. 7/8/9.

At 1006, the originating UE 300 may receive a response 314 to the session request 308 over the telecommunications network 304. The operation(s) at block 1006 may be similar to the operation(s) described with respect to block 706/906 of the process 700/900 of FIG. 7/9.

At 1008, the originating UE 300 may determine that the response 314 (e.g., within a header of the response 314) omits a feature tag used to indicate that a terminating device supports the exchange of text content via an RTT media stream. For example, a feature tag with a Feature_tag value='SIP Contact:text' may be omitted from the response 314 (e.g., not present in the header of the response 314). The omission of this expected feature tag may indicate the inability to establish the communication session with a full set of features for the exchange of text via a RTT media stream. For instance, the terminating device 302 may not be RTT-capable, and may be limited to receiving text content in a TTY message.

At 1010, the originating UE 300 may establish, without user intervention, a downgraded version of the communication session over the telecommunications network 304, wherein the downgraded version of the communication session does not support a full set of features for the exchange of the text content via an RTT media stream. For example, one or more RTT features typically provided during a RTT communication session may be made unavailable on the originating UE 300 in order to establish the communication session at block 1010. These excluded features may include, without limitation, simultaneous exchange of text content via a RTT media stream between the originating UE 300 and a terminating device 302, or simultaneous exchange of voice content via a voice media stream and the text content via a RTT media stream, and the like. In some embodiments, the originating UE 300 may receive a final 2xx response 324 indicating a successful connection with a terminating device 302 prior to establishing the downgraded version of the communication session at block 1010.

At 1012, the originating UE 300 may output, via an output device (e.g., a display, speaker(s), etc.), a notification (visible, audible, etc.) indicating a lack of support for a full set of RTT features. The operation(s) at block 1012 may be similar to the operation(s) described with respect to block 712/814/916 of the process 700/800/900 of FIG. 7/8/9.

Figure 11:
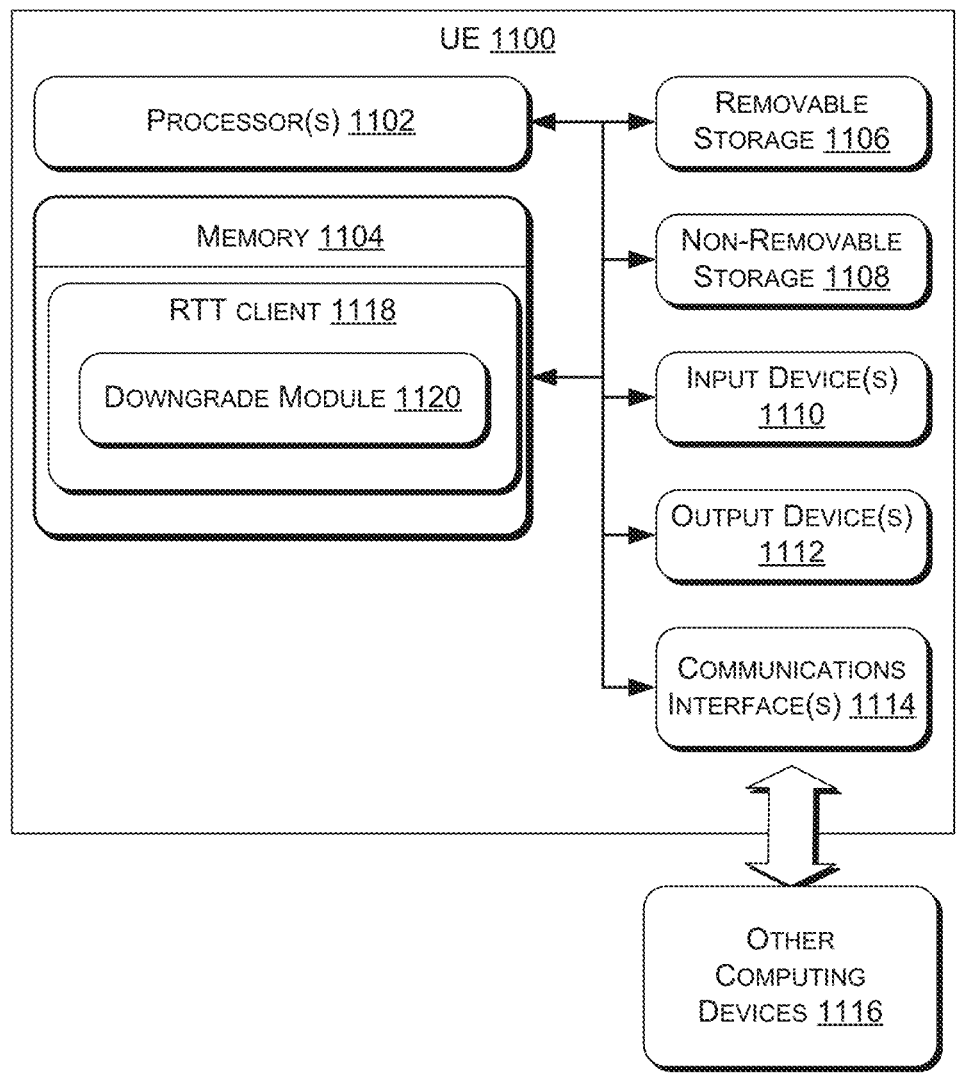
FIG. 11 is a block diagram of an example UE configured to establish a communication session by downgrading.

FIG. 11 is a block diagram of an example UE 1100 configured to establish a communication session by downgrading. The UE 1100 may be representative of the UE's 100/200/300 described herein.

As shown, the UE 1100 may include one or more processors 1102 and one or more forms of computer-readable memory 1104. The UE 1100 may also include additional storage devices. Such additional storage may include removable storage 1106 and/or non-removable storage 1108.

The UE 1100 may further include input devices 1110 and output devices 1112 (e.g., a display(s), speaker(s), etc.) communicatively coupled to the processor(s) 1102 and the computer-readable memory 1104. The UE 1100 may further include communications interface(s) 1114 that allow the UE 1100 to communicate with other computing devices 1116 (e.g., IMS nodes, other UEs) such as via a network. The communications interface(s) 1114 may facilitate transmitting and receiving wired and/or wireless signals over any suitable communications/data technology, standard, or protocol, as described herein. For example, the communications interface(s) 1114 can comprise one or more of a cellular radio, a wireless (e.g., IEEE 802.1x-based) interface, a Bluetooth® interface, and so on. The communications interface(s) 1114 may further enable the UE 1100 to communicate over circuit-switch domains and/or packet-switch domains.

In various embodiments, the computer-readable memory 1104 comprises non-transitory computer-readable memory 1104 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 1104 may also be described as computer storage media and may include volatile and nonvolatile, removable and non-removable media implemented in any method or technology for storage of information, such as computer readable instructions, data structures, program modules, or other data. Computer-readable memory 1104, removable storage 1106 and non-removable storage 1108 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 1100. Any such computer-readable storage media may be part of the UE 1100.

The memory 1104 can include a RTT client 1118 (including a downgrade module 1120). The RTT client 1118 and downgrade module 1120 may represent computer-executable instructions (or logic) that, when executed, by the processor(s) 1102, perform the various acts and/or processes disclosed herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. An originating user equipment (UE) comprising:
a processor; and
memory storing computer-executable instructions that, when executed by the processor, cause the originating UE to:
receive user input requesting to establish a communication session that supports an exchange of (i) voice content via a voice media stream and (ii) text content via a real time text (RTT) media stream;
send, over a telecommunications network, a session request to establish the communication session;
receive, over the telecommunications network, a response to the session request;
determine that the response to the session request indicates at least one of (i) an inability to establish the communication session, or (ii) an ability to establish the communication session without support for the exchange of the text content via the RTT media stream;
establish, without user intervention, a new communication session or a downgraded version of the communication session, wherein the new communication session or the downgraded version of the communication session does not support the exchange of the text content via the RTT media stream and instead supports an exchange of the non-voice content via an alternate form of text messaging, the alternate form of text messaging being a form of text messaging different from RTT; and display, on a display of the originating UE, a visual notification indicating a lack of support for the exchange of the text content via the RTT media stream.

2. The originating UE of claim 1, wherein:

the response to the session request comprises a Session Description Protocol (SDP) answer having a port value set to zero; and the computer-executable instructions, when executed by the processor, cause the originating UE to determine, based on the SDP answer having the port value set to zero, that the response to the session request indicates the ability to establish the communication session without support for the exchange of the text content via the RTT media stream.

3. The originating UE of claim 2, wherein:

the user input includes an emergency short code that requests the communication session be established with a public safety answering point (PSAP); and the computer-executable instructions, when executed by the processor, cause the originating UE to establish the downgraded version of the communication session with the PSAP.

4. The originating UE of claim 1, wherein:

the response to the session request comprises an error code; and the computer-executable instructions, when executed by the processor, cause the originating UE to determine, based on the error code, that the response to the session request indicates the inability to establish the communication session.

5. The originating UE of claim 4, wherein:

the user input includes an emergency short code that requests the communication session be established with a public safety answering point (PSAP), and the computer-executable instructions, when executed by the processor, cause the originating UE to establish the new communication session with the PSAP.

6. The originating UE of claim 4, wherein the computer-executable instructions, when executed by the processor, cause the originating UE to establish the new communication by:

automatically sending, without user intervention and over the telecommunications network, a new session request with a Session Description Protocol (SDP) offer that specifies support for the exchange of the voice content via the voice media stream, but does not specify support for the exchange of the text content via the RTT media stream; and receiving, over the telecommunications network, a new response indicating successful establishment of the new communication session.

7. A method comprising:

receiving, by an originating user equipment (UE), user input requesting to establish a communication session that supports an exchange of (i) voice content via a voice media stream and (ii) non-voice content via a real time text (RTT) media stream;

sending, by the originating UE and over a telecommunications network, a session request to establish the communication session;

receiving, by the originating UE and over the telecommunications network, a response to the session request;

determining that the response to the session request indicates at least one of (i) an inability to establish the communication session, or (ii) an ability to establish the communication session without support for the exchange of the non-voice content via the RTT media stream;

establishing, by the originating UE without user intervention, a new communication session or a downgraded version of the communication session, wherein the new communication session or the downgraded version of the communication session does not support the exchange of the non-voice content via the RTT media stream and instead supports an exchange of the non-voice content via an alternate form of text messaging, the alternate form of text messaging being a form of text messaging different from RTT; and outputting, via an output device of the originating UE, a notification indicating a lack of support for the exchange of the non-voice content.

8. The method of claim 7, wherein the non-voice content comprises text content, image content, or video content.

9. The method of claim 7, wherein the outputting of the notification comprises displaying, on a display of the originating UE, a visual notification indicating the lack of support for the exchange of the non-voice content via the RTT media stream.

10. The method of claim 7, wherein:

the response to the session request comprises a Session Description Protocol (SDP) answer having a port value set to zero; and the determining comprises determining, based on the SDP answer having a port value set to zero, that the response to the session request indicates the ability to establish the communication session without support for the exchange of the non-voice content via the RTT media stream.

11. The method of claim 10, wherein:

the user input includes an emergency short code that requests the communication session be established with a public safety answering point (PSAP); and the establishing comprises establishing the downgraded version of the communication session with the PSAP.

12. The method of claim 7, wherein:

the response to the session request comprises an error code; and the determining comprises determining, based on the error code, that the response to the session request indicates the inability to establish the communication session.

13. The method of claim 12, wherein:

the user input includes an emergency short code that requests the communication session be established with a public safety answering point (PSAP), and the establishing comprises establishing the new communication session with the PSAP.

14. The method of claim 12, wherein the establishing comprises establishing the new communication session by:

automatically sending, without user intervention and over the telecommunications network, a new session request with a Session Description Protocol (SDP) offer that specifies support for the exchange of the voice content via the voice media stream, but does not specify support for the exchange of the non-voice content via the RTT media stream; and receiving, over the telecommunications network, a new response indicating successful establishment of the new communication session.

15. One or more non-transitory computer-readable media storing computer-executable instructions that, when executed by one or more processors, cause an originating user equipment (UE) to:

receive user input requesting to establish a communication session that supports an exchange of (i) voice content via a voice media stream and (ii) non-voice content via a real time text (RTT) media stream;

send, over a telecommunications network, a session request to establish the communication session;

receive, over the telecommunications network, a response to the session request;

determine that the response to the session request indicates an ability to establish the communication session without support for the exchange of the non-voice content via the RTT media stream, wherein the determining includes determining that a header of the response to the session request omits a feature tag indicative of support for RTT;

establish, without user intervention, a new communication session or a downgraded version of the communication session, wherein the new communication session or the downgraded version of the communication session does not support the exchange of the non-voice content via the RTT media stream and instead supports an exchange of the non-voice content via an alternate form of text messaging, the alternate form of text messaging being a form of text messaging different from RTT; and output, via an output device of the originating UE, a notification indicating a lack of support for RTT and alternative support for the exchange of the non-voice content via the alternate form of text messaging.

16. The one or more non-transitory computer-readable media of claim 15, wherein the non-voice content comprises text content, image content, or video content.

17. The one or more non-transitory computer-readable media of claim 15, wherein outputting the notification comprises displaying, on a display of the originating UE, a visual notification indicating a lack of support for RTT and alternative support for the exchange of the non-voice content via the alternate form of text messaging.

18. The one or more non-transitory computer-readable media of claim 15, wherein:

the user input includes an emergency short code that requests the communication session be established with a public safety answering point (PSAP), and the computer-executable instructions, when executed by one or more processors, cause an originating UE to establish the new communication session with the PSAP by:

automatically sending, without user intervention and over the telecommunications network, a new session request with a Session Description Protocol (SDP) offer that specifies support for the exchange of the voice content via the voice media stream, but does not specify support for the exchange of the non-voice content via the RTT media stream; and receiving, over the telecommunications network, a new response indicating successful establishment of the new communication session.

* * * * *